US010629012B1

(12) United States Patent
Gattu et al.

(10) Patent No.: US 10,629,012 B1
(45) Date of Patent: Apr. 21, 2020

(54) MULTI-FACTOR AUTHENTICATION FOR VEHICLES

(71) Applicant: BlackBerry Limited, Waterloo (CA)

(72) Inventors: Balasubrahmanyam Gattu, San Ramon, CA (US); Bryan Nelson Grunow, Raleigh, NC (US); Tyler Coffin, Guelph (CA); Michael John Higgs, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/189,438

(22) Filed: Nov. 13, 2018

(51) Int. Cl.
*G07C 9/00* (2020.01)
*B60R 25/24* (2013.01)

(52) U.S. Cl.
CPC ........ *G07C 9/00309* (2013.01); *B60R 25/241* (2013.01); *B60R 25/246* (2013.01); *G07C 2009/00396* (2013.01); *G07C 2009/00436* (2013.01)

(58) Field of Classification Search
CPC ...... G07C 9/00309; G07C 2009/00769; G07C 9/00571; G07C 9/00111; G07C 9/00007; G07C 2209/63; G07C 2009/00793; G07C 9/00103; G07C 9/00896
USPC ...................................................... 340/5.61
See application file for complete search history.

(56) References Cited

U.S. PATENT DOCUMENTS

| 10,369,966 | B1* | 8/2019 | Higgins ................ H04W 12/08 |
| 2003/0034873 | A1* | 2/2003 | Chase .................... G06Q 10/02 340/5.2 |
| 2005/0197174 | A1 | 9/2005 | Hasan et al. |
| 2009/0195370 | A1 | 8/2009 | Huffman et al. |
| 2012/0254960 | A1 | 10/2012 | Lortz et al. |
| 2015/0363986 | A1 | 12/2015 | Hoyos et al. |
| 2017/0061714 | A1* | 3/2017 | Odejerte, Jr. ...... G07C 9/00571 |
| 2017/0096123 | A1 | 4/2017 | Gennermann et al. |
| 2017/0236343 | A1* | 8/2017 | Leboeuf ................ H04L 9/0825 340/5.61 |
| 2018/0009416 | A1* | 1/2018 | Maiwand ........... G07C 9/00182 |
| 2018/0091930 | A1* | 3/2018 | Jefferies ................ H04L 67/125 |
| 2018/0326947 | A1* | 11/2018 | Oesterling ............ B60R 25/241 |

* cited by examiner

*Primary Examiner* — Mark S Blouin
(74) *Attorney, Agent, or Firm* — Rowand LLP (57) ABSTRACT

A method for controlling access to a vehicle is disclosed. The method includes: receiving, from a communication subsystem of the vehicle, a first request to authenticate a user requesting access to the vehicle; sending, to an electronic device associated with the vehicle, an instruction to perform a multiple-factor authentication of a first user of the electronic device; receiving, from the electronic device, a first message indicating that an identity of the first user of the electronic device has been verified based on at least the multiple-factor authentication; and in response to receiving the first message, sending, to the communication subsystem of the vehicle, a second message indicating successful authentication of the first user.

14 Claims, 6 Drawing Sheets

MULTI-FACTOR AUTHENTICATION FOR VEHICLES

TECHNICAL FIELD

The present disclosure relates to vehicle security and, in particular, to systems and methods for authenticating users of a vehicle.

BACKGROUND

Vehicle security is of primary concern for owners of vehicles. The traditional method of restricting access to a vehicle by means of mechanical locks has been supplemented by remote keyless systems. In these systems, an electronic remote control is used as a key which is activated by a handheld device or automatically by proximity. A remote keyless system may be used to control one or both of vehicle entry and ignition start.

Due to the increased popularity of car- and ride-sharing services, there is significant interest in vehicle security systems that are capable of driver identification and authentication. For car-sharing or fleet vehicle (e.g. car rental) programs, a vehicle security system may authenticate the various users that share the vehicles. Ride-sharing services, such as Uber™ and Lyft™, take steps to ensure the safety of passengers. A vehicle security system may verify that the driver registered with the ride-sharing service is the person driving the vehicle. More generally, a vehicle security system may be configured to authenticate users not only for gaining entry to a vehicle but also for accessing various functionalities of the vehicle.

Such security systems may be challenging for vehicle owners to implement in their vehicles. Equipping a vehicle with aftermarket products (e.g. biometric sensors) for user authentication can be costly and undesirably complicated. Moreover, installing hardware that have fixed functions (e.g. keypads, RFID readers) may limit the flexibility of the security system to implement different techniques for authenticating users of a vehicle.

Security attacks are another area of concern. In-vehicle hardware may be open to attacks, such as hacking. If compromised, the security hardware may be ineffective in preventing unauthorized access to the vehicle and its features. As a consequence, the security hardware may require costly replacement or re-programming procedures.

Thus, it would be advantageous to provide systems and methods for authenticating users of a vehicle that do not rely primarily on in-vehicle security hardware.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a method for controlling access to a vehicle. The method includes: receiving, from a communication subsystem of the vehicle, a first request to authenticate a user requesting access to the vehicle; sending, to an electronic device associated with the vehicle, an instruction to perform a multiple-factor authentication of a first user of the electronic device; receiving, from the electronic device, a first message indicating that an identity of the first user of the electronic device has been verified based on at least the multiple-factor authentication; and in response to receiving the first message, sending, to the communication subsystem of the vehicle, a second message indicating successful authentication of the first user.

In another aspect, the present disclosure describes another method for controlling access to a vehicle. The method includes: receiving, from an electronic device associated with the vehicle, a first request to access the vehicle; sending, to the electronic device, an instruction to perform a multiple-factor authentication of a first user of the electronic device; receiving, from the electronic device, a first message indicating that an identity of the first user of the electronic device has been verified based on at least the multiple-factor authentication; verifying that the first user is authorized to access the vehicle; and in response to the verifying, sending, to a communication subsystem of the vehicle, a second message requesting the vehicle to grant access to the vehicle.

In yet another aspect, the present disclosure describes a system for controlling access to a vehicle. The system includes a memory and a processor coupled to the memory. The processor is configured to: receive, from a communication subsystem of the vehicle, a first request to authenticate a user requesting access to the vehicle; send, to an electronic device associated with the vehicle, an instruction to perform a multiple-factor authentication of a first user of the electronic device; receive, from the electronic device, a first message indicating that an identity of the first user of the electronic device has been verified based on at least the multiple-factor authentication; and in response to receiving the first message, send, to the communication subsystem of the vehicle, a second message indicating successful authentication of the first user.

In yet another aspect, the present disclosure describes another system for controlling access to a vehicle. The system includes a memory and a processor coupled to the memory. The processor is configured to: receive, from an electronic device associated with the vehicle, a first request to access the vehicle; send, to the electronic device, an instruction to perform a multiple-factor authentication of a first user of the electronic device; receive, from the electronic device, a first message indicating that an identity of the first user of the electronic device has been verified based on at least the multiple-factor authentication; verify that the first user is authorized to access the vehicle; and in response to the verifying, send, to a communication subsystem of the vehicle, a second message requesting the vehicle to grant access to the vehicle.

Other example embodiments of the present disclosure will be apparent to those of ordinary skill in the art from a review of the following detailed descriptions in conjunction with the drawings.

The present disclosure describes techniques for authenticating users of a vehicle. User authentication facilitates controlling access to, for example, vehicle entry/unlock, ignition start, and various in-vehicle functionalities (e.g. entertainment, navigation, etc.). If a vehicle has a single authorized user, the security scheme for the vehicle is simple: grant access to all features of the vehicle to only the single authorized user, and prohibit use of the vehicle by anyone else. If a vehicle is shared by multiple different users, a security system for the vehicle may be configured to control access based on the identities of authorized users. In particular, the security system may restrict vehicle access to authorized users and grant authorized users access to only those features of the vehicle for which they have been authorized. For example, an authorized user of a vehicle may be granted access to those features that are included in an authorization profile for the user, and prohibited from accessing any features that are not included in the authorization profile.

It can be challenging to implement a secure system of user authentication for vehicles. Equipping a vehicle with security hardware for authentication may be costly. Moreover, the security hardware may have vulnerabilities which may be exploited by unauthorized users to compromise the authentication scheme.

The present disclosure proposes techniques for integrating multi-factor authentication into vehicle security systems. User devices that are in communication with a vehicle security server may be used to perform multi-factor authentication. That is, authentication of a user of a vehicle is performed, at least in part, on a device associated with the user. A vehicle security server may be communicably connected to one or more vehicles. Upon receiving a request to verify that a user is authenticated for accessing a vehicle or a functionality of the vehicle, the vehicle security server transmits an instruction to a device associated with the requesting user to perform multi-factor authentication. For example, a mobile device (e.g. smartphone) of the requesting user may be used to authenticate the user for accessing the vehicle.

The on-device authentication may be based on one or a plurality of factors. In particular, a user may be granted access to a vehicle (or a functionality thereof) after successfully supplying two or more authentication factors on their device. The factors may, for example, include knowledge factors (i.e. something only the user knows, such as a password), possession factors (i.e. something only the user has, such as a security token), and inherence factors (e.g. something only the user is, such as biometrics).

If the multi-factor authentication of a requesting user is successful, the user's device notifies the vehicle security server that the user is authenticated for the requested access. The vehicle security server then checks if the user is authorized for accessing the vehicle or feature and provides an indication of authorization success to the vehicle. The vehicle can then grant the requested access to the requesting user.

Figure 1:
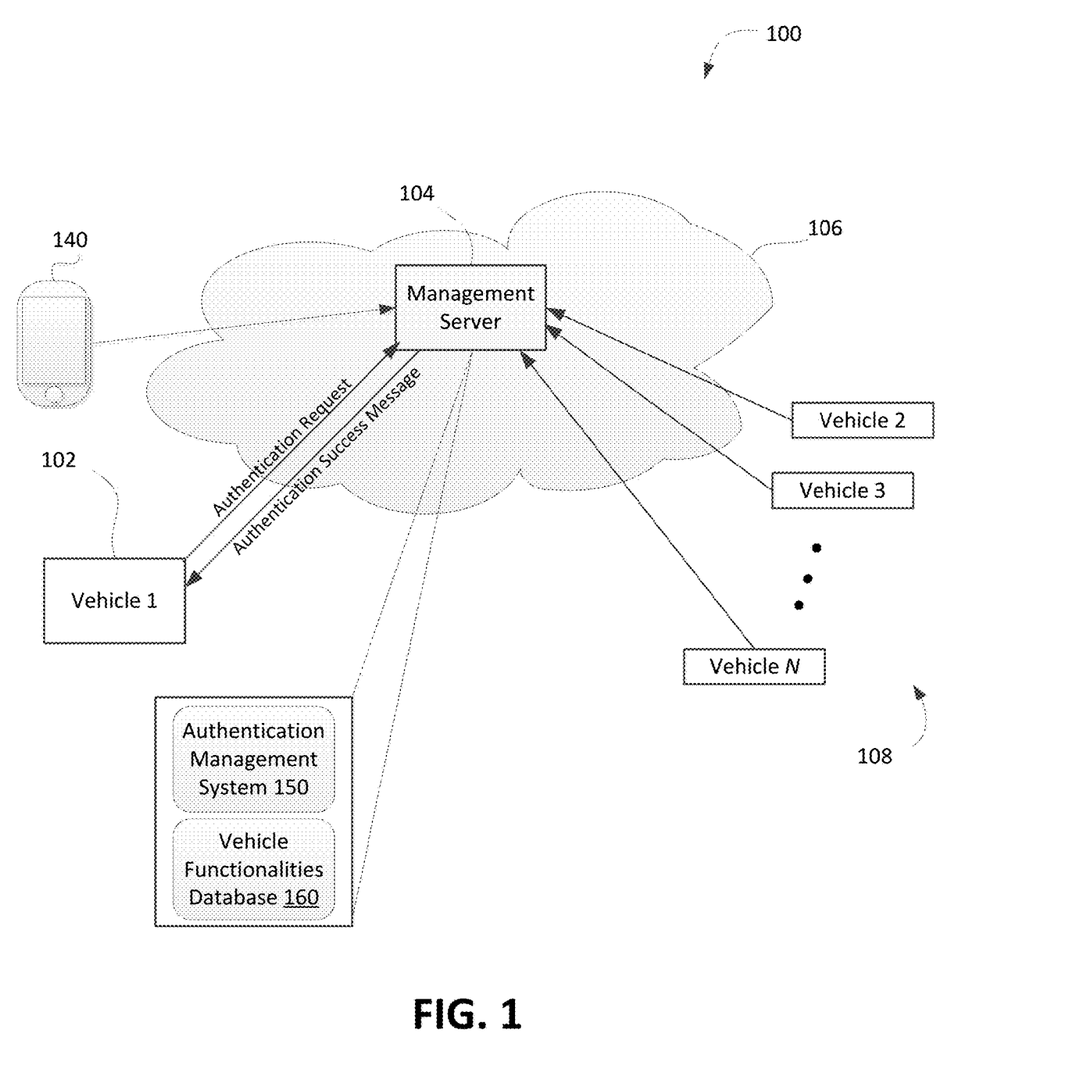
FIG. 1 diagrammatically shows an exemplary operating environment for managing user authentications for vehicles.

Reference is made to FIG. 1, which shows an exemplary operating environment 100 in accordance with embodiments of the present disclosure. FIG. 1 illustrates an exemplary authentication management system (AMS) 150 for managing user authentication for vehicles. The AMS 150 may implement processes for, among others: administering vehicle security management, including vehicle enrolment; authorized vehicle users registration; handling authentication request formalities; obtaining authentication factors; updating access privilege data for authorized users; requesting user devices to perform multi-factor authentication; verifying user authentication for requested access; and notifying vehicles of user authentication success or failure.

The environment 100 includes at least a first vehicle 102. The first vehicle 102 is in wireless communication with a management server 104. The environment 100 may also include a plurality of vehicles 108 that are in wireless communication with the server 104. Each vehicle in environment 100 includes a computer system. Specifically, each vehicle includes a communication subsystem that is configured for data communication with the server 104.

The environment 100 also includes at least one electronic device 140. The electronic device 140 may be associated with a user requesting access (e.g. vehicle entry, access to specific vehicle functionality, etc.) to a vehicle. In some embodiments, the electronic device 140 may be a portable electronic device. For example, the electronic device 140 may, as illustrated, be a smartphone. The electronic device 140 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In some embodiments, the electronic device 140 may include a smart card, chip card, integrated circuit card (ICC), and/or other card having an embedded integrated circuit.

The electronic device 140 is configured to execute software, such as a vehicle sharing application (not shown). A vehicle sharing application may, for example, be a web application (e.g. single-page application, or SPA), a mobile application, or a desktop application. The vehicle sharing application may be an app that can be used to request access to a vehicle (such as first vehicle 102) and one or more of its functionalities. In some embodiments, the vehicle sharing application may indicate to users one or more vehicles that are available for sharing/renting, time and duration of availability, and the features of the vehicles that may be accessed, such as vehicle entry, ignition start, in-vehicle infotainment, and navigation (e.g. built-in GPS and navigation). For example, the vehicle sharing application may accept user input specifying time and duration of requested access, vehicle identifier (e.g. RFID tag), and vehicle features that are requested to be accessed.

In some embodiments, the vehicle sharing application may be used for performing authentication of a user requesting access to a vehicle. For example, a user may be able to both request access to a vehicle and supply identity-verifying factors using the vehicle sharing application. If access is granted to a requesting user, the vehicle sharing application may be used to confirm acceptance of the granted access (e.g. rental). The vehicle sharing application may associate the requesting user (e.g. contact details of the user) with the electronic device 140 and the vehicle (and functionalities thereof) for which the user is granted access.

The network 106 is a computer network. The network 106 allows computer systems in communication therewith to communicate. For example, as illustrated, the network 106 may allow the vehicles 102 and 108 and electronic device 140 to communicate with a server 104 implementing an authentication management system associated with the vehicles 102 and 108.

The authentication management system (AMS) 150 is implemented as part of a computer system. In particular, the AMS 150 may be implemented by a remote server, such as server 104, which is communicably connected to a plurality of vehicles and user devices. The server 104 may comprise one or more computing devices. In some embodiments, the server 104 may be associated with a fleet management entity (e.g. car rental companies) that manages a plurality of vehicles and interfaces with devices associated with current and/or prospective customers. For example, vehicles may be enrolled to a fleet management system, and the server 104 may be used for management of the enrolled vehicles, including operations relating to controlling access to the vehicles.

The computing devices of the server 104 may be in communication with each other using the network 106. Alternatively, the computing devices may communicate using another network such as, for example, a local-area network (LAN). In some embodiments, the AMS 150 may be implemented by multiple computing devices organized in a tiered arrangement (e.g. middle-tier and back-end computing devices). In some embodiments, the AMS 150 may be provided by a cluster formed of a plurality of interoperating computing devices.

The AMS 150 may, in association with one or more different computer systems, handle various services relating to, among others, vehicle security management, registration of authorized vehicle users, handling authentication request formalities, obtaining authentication factors, updating access privilege data for authorized users, requesting user devices to perform multi-factor authentication, verifying user authentication for requested access, and notifying vehicles of user authentication success or failure. FIG. 1 illustrates a vehicle functionalities database 160, which may be included as part of server 104. The vehicle functionalities database 160 may be integrated into the AMS 150, or it may be provided as a separate database that is communicably coupled to the server 104. For example, a fleet management system may implement the vehicle functionalities database 160, and the server 104 associated with the fleet management system may be configured to communicate with the database, for example, by using API calls or via database access.

The vehicle functionalities database 160 may contain information relating to one or more vehicles and their associated functionalities. More specifically, the vehicle functionalities database 160 may store information identifying one or more vehicles that are managed by the AMS 150 and functionalities of those vehicles (e.g. vehicle entry, ignition start, self-driving, infotainment, navigation, wireless communication, heating, air conditioning, etc.) that are available to be accessed by users. For each vehicle that is enrolled in the AMS 150, the vehicle functionalities database 160 may include at least one identifier for the vehicle and indicate the accessible functionalities of the vehicle. In some embodiments, the vehicle functionalities database 160 may identify users that are authorized to access the various functionalities associated with the enrolled vehicles. That is, for each managed vehicle, the vehicle functionalities database 160 may specify the accessible functionalities of the vehicle and the users that are authorized to access such functionalities. In particular, the authorized users of a vehicle may have different levels of authorization (e.g. different sets of functionalities that they are permitted to access).

The vehicle functionalities database 160 may store other information relating to the managed vehicles and their accessible functionalities. In some embodiments, the vehicle functionalities database 160 may indicate authentication factors which may be used in authenticating users for access of various functionalities of a managed vehicle. For each accessible functionality of a managed vehicle, the vehicle functionalities database 160 may indicate the factors (e.g. password, biometric data, etc.) that are required to be supplied by a user prior to being granted access to the functionality. The authentication factors may all need to be supplied, or a subset of the authentication factors may need to be supplied, in order to gain access to a vehicle functionality. Alternatively, the authentication factors that are associated with various functionalities of managed vehicles may be included in a data store that is separate from the vehicle functionalities database 160.

The server 104 may be configured to update the vehicle functionalities database 160. In particular, the server 104 may add or delete vehicles, accessible functionalities, and authorized users.

Figure 2:
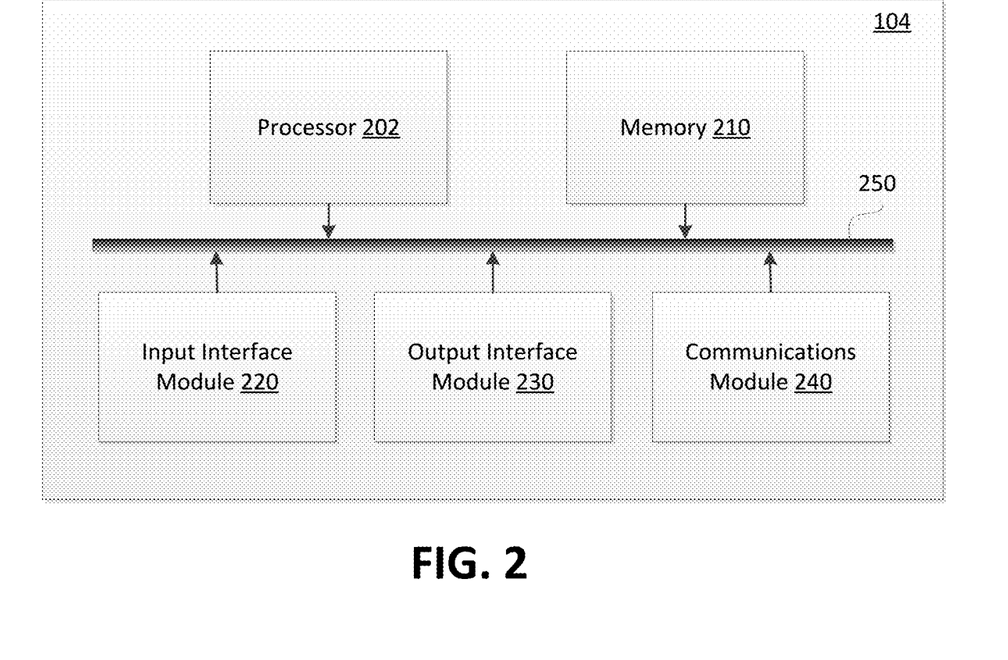
FIG. 2 is a high-level operation diagram of an example computing system for implementing example embodiments of an authentication management system for vehicles.

Reference is now made to FIG. 2, which is a high-level operation diagram of an example server 104 (i.e. a computing system) that may be configured to implement a system for managing authentication of vehicle users. The server 104 of FIG. 1 includes a variety of modules. For example, as illustrated, the server 104 may include a processor 202, a memory 210, an input interface module 220, an output interface module 230, and a communications module 240. As illustrated, the foregoing example modules of the server 104 are in communication over a bus 250.

The processor 202 is a hardware processor. For example, the processor 202 may be one or more ARM, Intel x86, PowerPC processors, or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of a user device.

The input interface module 220 allows the server 104 to receive input signals. Input signals may, for example, correspond to input received from a user. The input interface module 220 may serve to interconnect the server 104 with one or more input devices. Input signals may be received from input devices by the input interface module 220. Input devices may, for example, include one or more of a touch-screen input, keyboard, trackball or the like. In some embodiments, all or a portion of the input interface module 220 may be integrated with an input device. For example, the input interface module 220 may be integrated with one of the aforementioned example input devices.

The output interface module 230 allows the server 104 to provide output signals. Some output signals may, for example allow provision of output to a user. The output interface module 230 may serve to interconnect the server 104 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps (such as for, example, light-emitting diodes (LEDs)), and printers. In some embodiments, all or a portion of the output interface module 130 may be integrated with an output device. For example, the output interface module 130 may be integrated with one of the aforementioned example output devices.

The communications module 240 allows the server 104 to communicate with other vehicles, electronic devices, and/or various communications networks. For example, the communications module 240 may allow the server 104 to send or receive communications signals. Communications signals may be sent or received according to one or more protocols or according to one or more standards. For example, the communications module 240 may allow the server 104 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the server 104 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the server 104. For example, the communications module may be integrated into a communications chipset.

Software comprising instructions is executed by the processor 202 from a computer-readable medium. For example, software may be loaded into random-access memory from persistent storage of memory 210. Additionally or alternatively, instructions may be executed by the processor 202 directly from read-only memory of memory 210.

Figure 3:
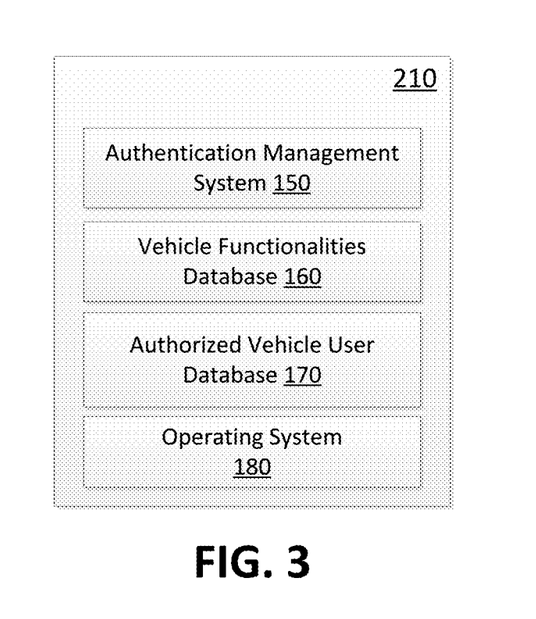
FIG. 3 depicts a simplified software organization of the example computing system of FIG. 2.

FIG. 3 depicts a simplified organization of software components stored in memory 210 associated with the server 104. As illustrated, these software components include an operating system 180, AMS 150, vehicle functionalities database 160, and authorized vehicle user database 170.

The operating system 180 is software. The operating system 180 allows the AMS 150 to access the processor 202, the memory 210, the input interface module 220, the output interface module 230 and the communications module 240. The operating system 180 may be, for example, Apple iOS™, Google™ Android™, Linux™, Microsoft™ Windows™, or the like.

The memory 210 may include an authorized vehicle user database 170. The authorized vehicle user database 170 contains information on vehicles that are managed by AMS 150 and the users that are authorized to access the vehicles. For example, the authorized vehicle user database 170 may include a list of a plurality of vehicles and their functionalities, and for each listed functionality, specify all of the users that are authorized to access the functionality. In some cases, the authorized vehicle user database 170 may not be included in memory 210. For example, the authorized vehicle user database 170 may be implemented by an independent system, such as a fleet management system. The server 104 may be configured to access or communicate with the authorized vehicle user database 170 to obtain information on managed vehicles.

Figure 4:
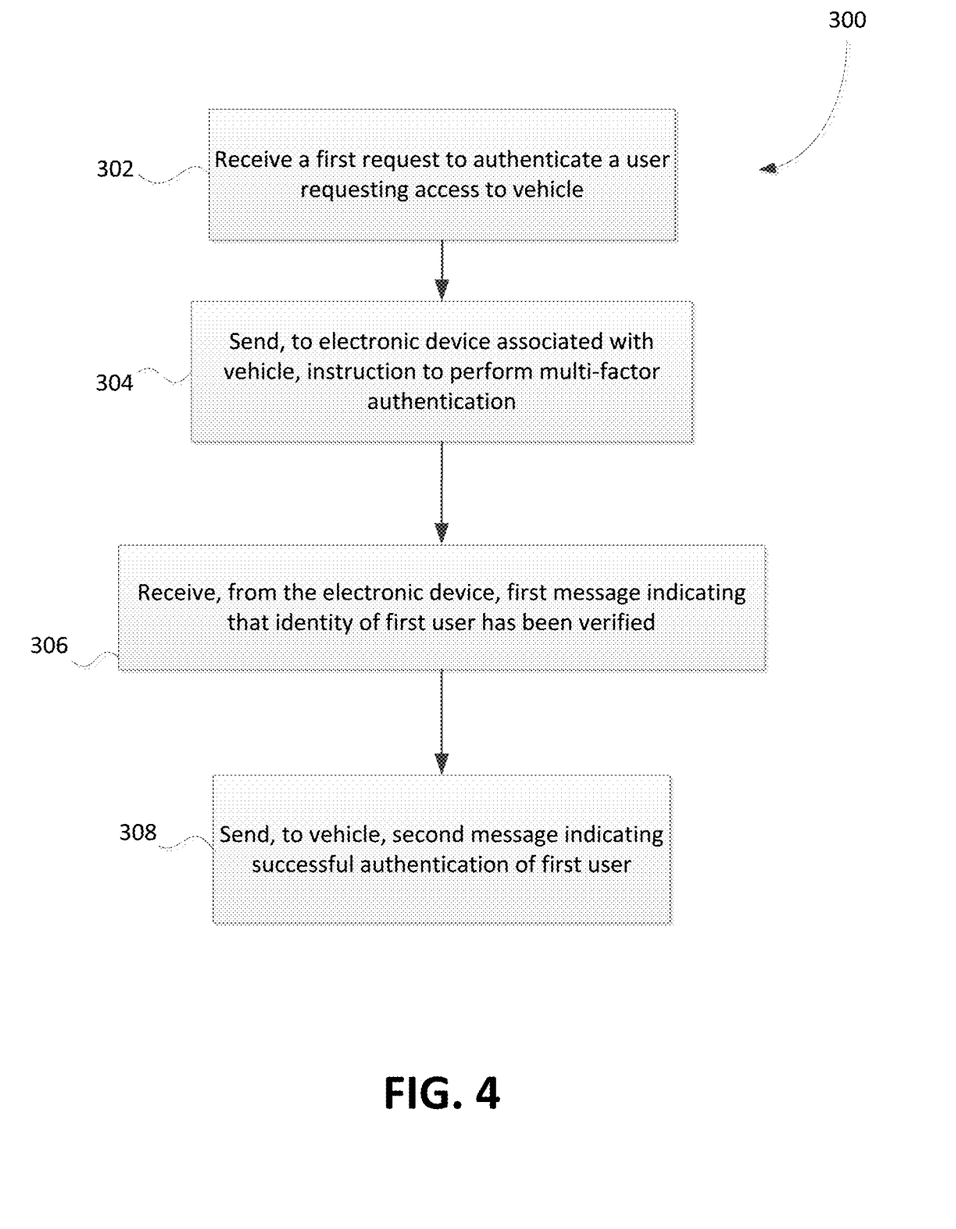
FIG. 4 shows, in flowchart form, an example method for controlling access to a vehicle.

Reference is made to FIG. 4, which shows, in flowchart form, an example method 300 for controlling access to a vehicle. The method 300 may be performed by a server, such as server 104, or another computing system, which is communicably coupled to one or more vehicles. The server may administer a vehicle authentication management service, such as AMS 150 of FIG. 1. A server for managing operations and security of vehicles may perform method 300 to control user access of one or more vehicles that are managed by the server. In particular, the server may be configured to restrict access for the managed vehicles to only those users that are authorized to do so. The server is also communicably coupled to one or more electronic devices corresponding to users that request access to the vehicles managed by the server.

In operation 302, the server receives, from a communication subsystem of a vehicle, a first request to authenticate a user that requests access to the vehicle. In some embodiments, the first request may be generated based on an access request by a current user of the vehicle. For example, a driver (or other occupant) of the vehicle may input a selection of a functionality of the vehicle that they wish to access. The selection of the requested functionality may be input using an in-vehicle device (such as display screens and remote controllers) or mechanical interfaces (such as control buttons and switches). In some cases, the first request may be generated based on a vehicle entry request made by an individual who wishes to access the vehicle. For example, a prospective user of the vehicle may request, using one or more externally accessible devices (e.g. sensors, RFID readers, keypads) on the vehicle, to unlock the vehicle. The request for access to the vehicle may also be made via an application on a user device. That is, in addition to the options of making an in-vehicle selection of a desired functionality and requesting vehicle unlock from outside a vehicle, a user may be able to request access to a functionality of a vehicle using an application on her device, such as a smartphone. For example, a mobile app may provide a graphical user interface for selecting a vehicle and/or a functionality of the vehicle for which access may be requested.

The first request may indicate information identifying the vehicle and one or more of the vehicle's functionalities that are requested to be accessed. In at least some embodiments, the first request may identify a user that is making the access request. For example, a user may be prompted to identify herself when selecting a functionality of the vehicle to request access to, and the identifying details of the user may be included in the first request to the server. In some cases, a controller or processor of the vehicle may be configured to deduce the user that is making a particular request. For example, the driver of the vehicle, having gained vehicle entry and access to ignition start, may be inferred to be the user making a request to access the selected functionality.

In operation 304, the server sends, to an electronic device associated with the vehicle, an instruction to perform authentication of a first user of the electronic device. The electronic device may be a device that is associated with an authorized user of the vehicle. A user may request to use a vehicle via an application that is installed on the user's electronic device. For example, a reservation to use a vehicle may be made and confirmed via a mobile app on a user's electronic device. A user may also register with a vehicle access management service using a mobile app. A user (e.g. vehicle renter) can, for example, enter their contact information in a mobile app to register for a renting or car-sharing service. A device of a user that is authorized for accessing a vehicle may thus be associated with the vehicle, via the mobile app. In some embodiments, the association of a user's device with the vehicle for which the user is authorized to access may be stored in a database that is accessible to the server.

Alternatively, the electronic device may be a device that is currently connected with the vehicle. For example, a user device may be paired wirelessly (e.g. connection via Bluetooth) or through a wired connection (e.g. connection via a dock or charging cable) with one or more modules of the vehicle.

In this way, the server selects a device that is currently associated with the vehicle and sends the device an instruction to perform authentication of a first user of the device. In particular, the device is instructed to perform a multi-factor authentication of a user of the device. For example, the device may be instructed to prompt the user of the device to supply multiple pieces of information to verify her identity.

In operation 306, the server receives, from the electronic device, a first message indicating that an identity of the first user of the electronic device has been verified based on at least the multi-factor authentication. In response to receiving this first message, the server sends to the communication subsystem of the vehicle, a second message indicating that the first user has been successfully authenticated, in operation 308.

In some embodiments, the electronic device that is associated with the vehicle may be assumed to belong to a requesting user (e.g. driver) that is authorized to access the vehicle and its functionalities. If this is the case, the authentication of the user by the electronic device may be sufficient for the vehicle to grant access to the requesting user. However, in other embodiments, an additional check may be performed, by one or both of the server and the vehicle, to verify that the user that is authenticated by the electronic device is an authorized user of the vehicle. For example, the electronic device may be instructed to perform multi-factor authentication to verify the identity of a specific individual who is authorized to access the vehicle. Alternatively, the server may, upon receiving the first message of successful verification, perform a check to determine whether the authenticated individual is a user that is authorized to access the vehicle.

Figure 5:
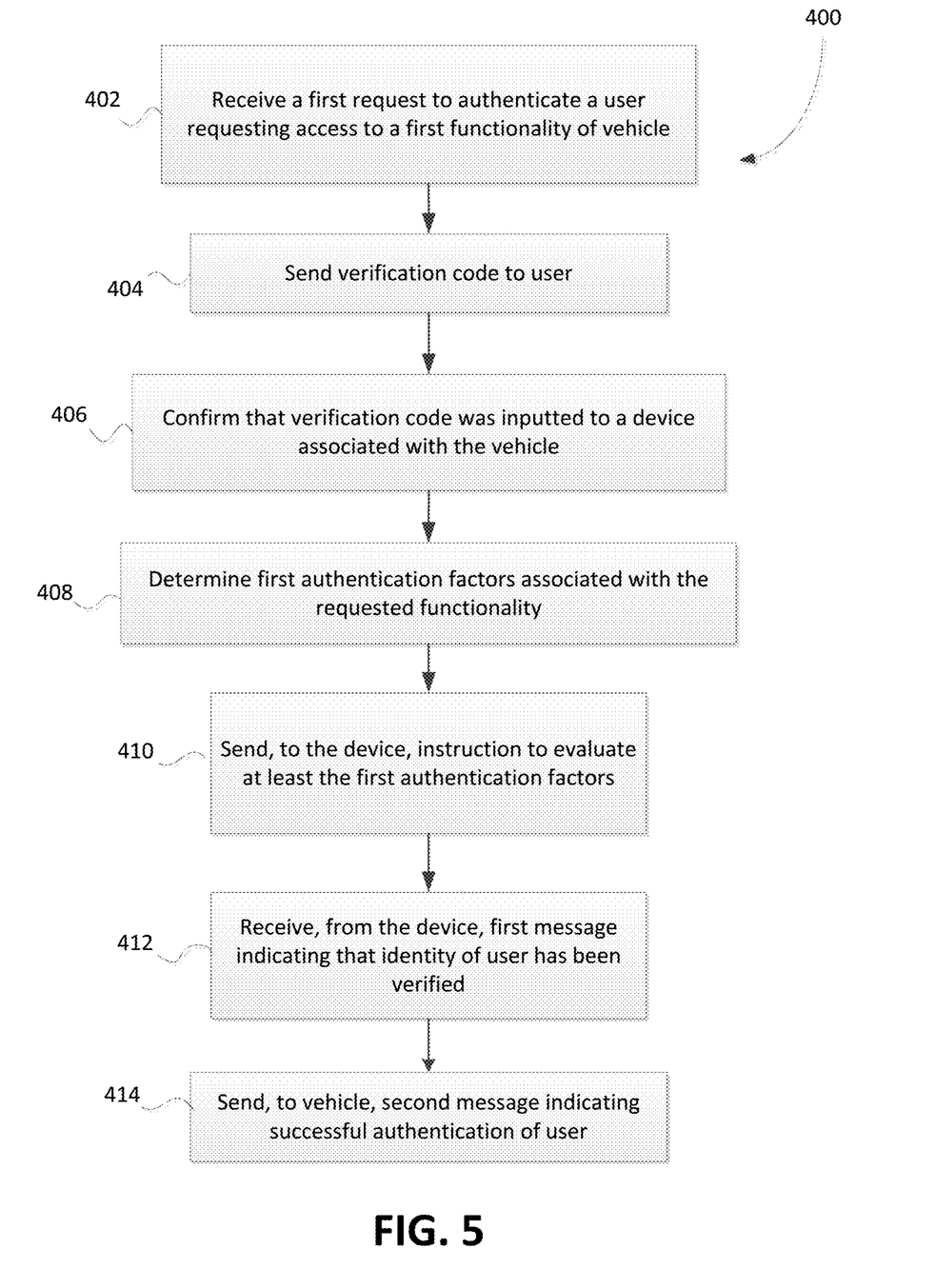
FIG. 5 shows, in flowchart form, an example method for controlling access to a specific functionality of a vehicle.

Reference is now made to FIG. 5, which shows in flowchart form, an example method 400 for controlling access to a specific functionality of a vehicle. The method 400 may be performed by a server, such as server 104, or another computing system, which is communicably coupled to one or more vehicles and configured to manage authentication of users of the vehicles. A server for managing operations and security of vehicles may perform method 400 to grant or deny access to users that request to access specific functionalities of vehicles that are managed by the server.

In operation 402, the server receives, from a communication subsystem of a vehicle, a first request to authenticate a user that requests access to a first functionality of the vehicle. The first functionality may, for example, be ignition start, infotainment, self-driving, heating, air conditioning, or an in-vehicle mobile app (e.g. map).

Upon receiving the request, the server sends a verification code to a first user, in operation 404. The verification code may be an alphanumeric code that is randomly generated at the server. The verification code is sent to a user that requests to access the first functionality of the vehicle. For example, the verification code may be sent to a current driver (or other occupant) of the vehicle who selects an in-vehicle functionality. As another example, the verification code may be sent to a vehicle renter who requests to gain entry to a newly rented vehicle. More generally, the server obtains contact details (e.g. email address, phone number, etc.) of an individual that requests access to the first functionality of the vehicle and sends a verification code in a message to the requester. The identity of the requester may be determined based on, for example, an express indication by the requester of her identity in the request for access, or an association of the device (i.e. application) that is used to make the request and the user of the device.

In operation 406, the server confirms that the verification code was inputted to a device associated with the vehicle. For example, the server may receive a confirmation message from the user device that the correct verification code was inputted to the user device.

The server may then proceed to instruct the user device to perform multi-factor authentication of the requester. In at least some embodiments, the server determines one or more first authentication factors associated with the first functionality of the vehicle that is requested to be accessed. A multi-factor authentication of a user may be customized such that different factors are tested for different functionalities, users, and even vehicles. In particular, different functionalities of a vehicle may have different sets of authentication factors that are required to be supplied by a user in order for the user to be successfully authenticated. Thus, a server may obtain a suitable set of authentication factors based on the specific functionality of a vehicle that is requested by a user, prior to instructing a user device to perform user authentication.

The selection, by the server, of authentication factors to test may depend on the particular requesting user. For example, authentication factors may include one or more of birth date, secret question, location (e.g. postal code), place of last car rental, and biometric factors. Furthermore, the selection of authentication factors to use in verifying a requesting user may be randomly chosen by the server. That is, the server may randomly select which of the authentication factors associated with a vehicle/functionality are to be tested in the multi-factor authentication step, and provide the selection to the user device.

In some embodiments, a server may retrieve authentication factors associated with the requested first functionality from a data store. For example, a server may query a database, such as vehicle functionalities database 160, which stores mappings of authentication factors to functionalities of a vehicle. In such a database, the authentication factors may be categorized by vehicle, functionality, and actual requirement that needs to be satisfied for authentication. For example, the database may indicate whether all authentication factors associated with a functionality need to be supplied, or only a subset has to be supplied, before a user can be authenticated for access to the functionality.

Once the first authentication factors are retrieved, the server sends an instruction to the user device to perform a multi-factor authentication of the requester, in operation 410. In particular, the instruction includes a requirement for the user device to evaluate at least the one or more first authentication factors associated with the requested functionality. That is, the user device is instructed to test that at least the first authentication factors are supplied by the requester before authenticating the requester's identity.

In operation 412, the server receives, from the user device, a first message indicating that the identity of requesting user has been verified, based on the multi-factor authentication. The server may then notify the vehicle, by a second message, that the user requesting the first functionality has been successfully completed.

Figure 6:
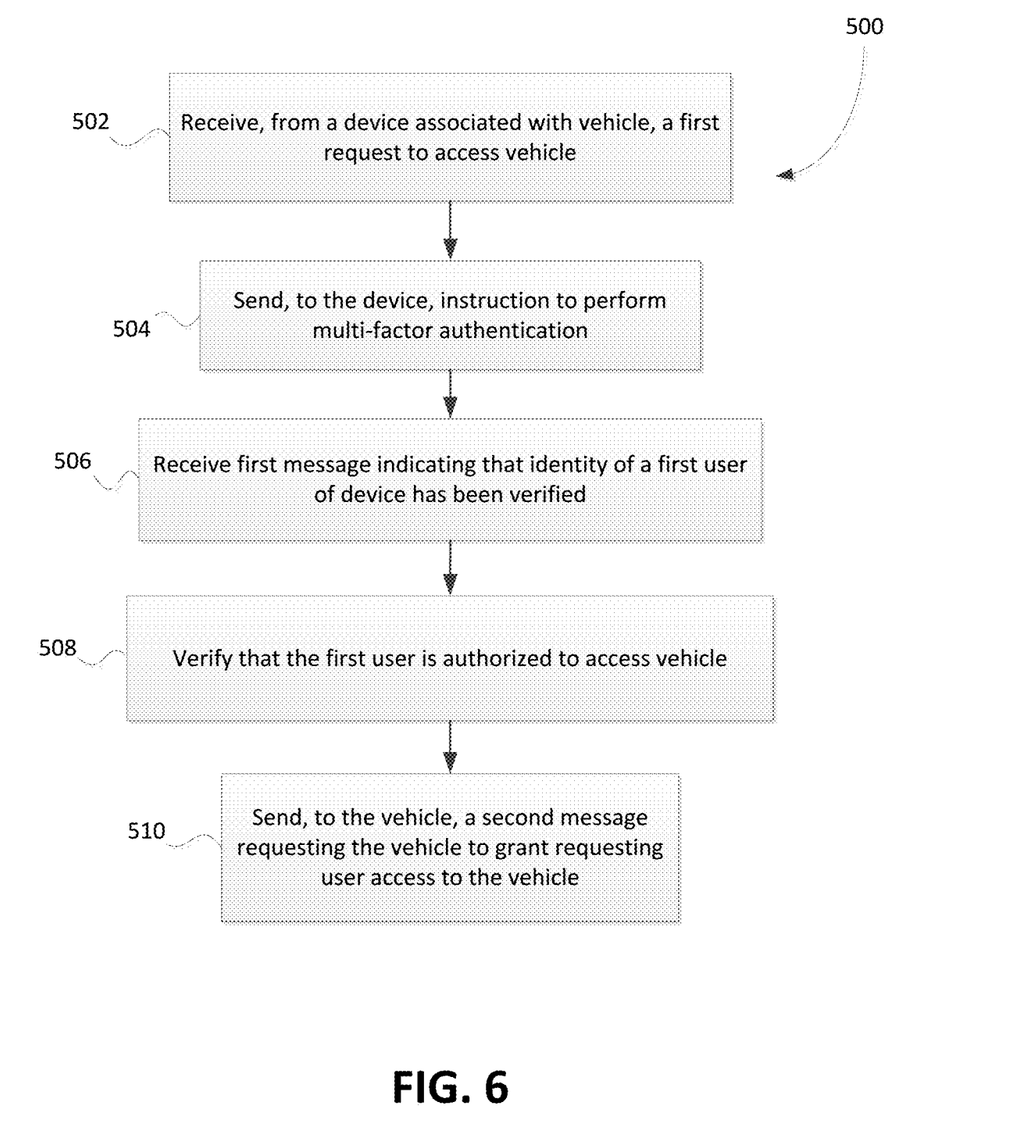
FIG. 6 shows, in flowchart form, another example method for controlling access to a vehicle.

Reference is now made to FIG. 6, which shows, in flowchart form, another example method 500 for controlling access to a vehicle. The method 500 may be performed by a server, such as server 104, or another computing system, which is communicably coupled to one or more vehicles and configured to manage authentication of users of the vehicles.

A vehicle authentication management server, such as server 104, may receive a request for access to a vehicle or a specific vehicle functionality from a user device associated with the requester. In operation, the serve receives, from a user device associated with a vehicle, a first request to access the vehicle. The user may generate the request by an input on the user device. For example, the user may input, via an application on the user device, a selection of a vehicle and/or a vehicle functionality. The access request input can be done manually by the user, or by various other means, such as image capture, RFID tag scan, etc. As an example, a vehicle authentication app on the user device may provide a feature to scan an RFID tag that is located on the vehicle that is requested to be accessed. Upon scanning, the app/device may be configured to generate a suitable access request for transmission to the vehicle authentication management server.

Upon receiving the first request, the server sends, to the user device, instructions to perform a multi-factor authentication of the requesting user, in operation 504. If the user device confirms that the requester has been authenticated, the server receives, in operation 506, a first message indicating that the identity of the requester has been successfully verified. As discussed above, the server may do an additional check to verify that the user that was authenticated by the user device is actually authorized to access the requested vehicle. In particular, the server may check that the identity of the individual that was verified by the user device matches one of the users that have been authorized to access the vehicle, in operation 508. The server may then send, to the vehicle, a second message requesting that the vehicle grant access to the requesting user.

Figure 7:
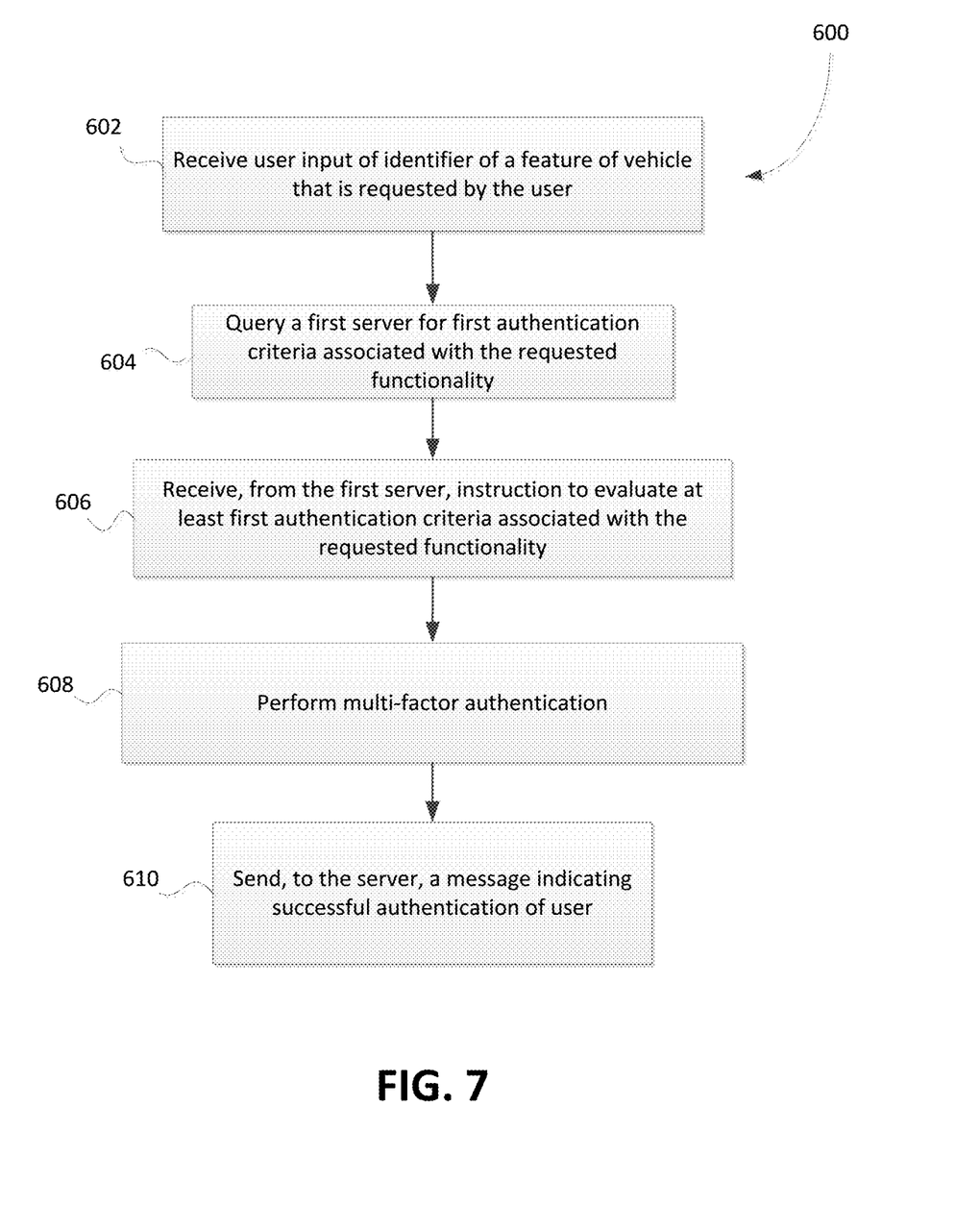
FIG. 7 shows, in flowchart form, an example method for processing a request to perform multi-factor authentication of a user requesting access to a vehicle.

FIG. 7 shows, in flowchart form, an example method 600 for performing a multi-factor authentication of a user requesting access to a vehicle. The method 600 may be performed by an electronic device that is associated with a vehicle, such as a device of a user that owns, rents, or reserves to use the vehicle. In particular, a device associated with a user that requests access to a vehicle, or one or more functionalities of the vehicle, may be configured to perform method 600. For example, the method 600 may be implemented via a mobile app that is installed on a requesting user's device.

In operation 602, the user device receives input of an identifier of at least a vehicle for which access is requested. The user input may be a manual selection (e.g. on a mobile app) or another form of data input, such as image capture or scan of an RFID tag. In some embodiments, the user input may also identify a specific functionality of the vehicle that is requested to be accessed. For example, a mobile app on the user device may provide a graphical user interface for selecting one or more functionalities of a specific vehicle for which a user can request access.

In operation 604, the user device queries a first server for first authentication criteria associated with the requested vehicle and/or functionality. That is, rather than receiving one or more authentication factors from a server managing user authentication for vehicles, the user device may itself be configured to obtain authentication criteria that is associated with a specific vehicle or functionality. For example, the user device may query a vehicle authentication manager server or a database hosting vehicle authentication data, to obtain the authentication criteria. In some embodiments, the user device may obtain the first authentication criteria without an external query to a server. In particular, the authentication data may be available on the user device. For example, an application on the user device, such as a vehicle sharing application, may contain or have access to data stored internally indicating which authentication factors may be used for verifying the identity of the requesting user. The application data may, for example, include one or more authentication factors for the requesting user, which may be input at the time of application registration or setup. The authentication factors may, in some embodiments, be stored on the user device, outside any application data. For example, a data store containing authentication factors that are commonly used by processes or modules on the user device may be accessed to retrieve suitable authentication factors associated with the requested vehicle and/or functionality.

When the user device receives, in operation 606, instructions from a vehicle management server to perform a multi-factor authentication of a user for a functionality requested by the user, the user device performs the authentication and evaluates at least the first authentication criteria, in operation 608. In some embodiments, the user device may first receive instructions to perform authentication of a user of the device and subsequently query a database of authentication factors to obtain those factors that are associated with the requested vehicle/functionality. Upon successful authentication of the requesting user, the user device sends, to the server, a message indicating that the identity of the requesting user has been verified, in operation 610.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for controlling access to a vehicle, the method comprising:
   receiving, at a vehicle authentication management server from a communication subsystem of the vehicle, a first request to authenticate a user requesting access to a first functionality associated with the vehicle;
   sending, by the vehicle authentication management server to an electronic device associated with the vehicle, an instruction to perform, on the electronic device, a multiple-factor authentication of a first user of the electronic device based on one or more first authentication factors associated with the first functionality, wherein the instruction includes a requirement for the electronic device to evaluate at least the one or more first authentication factors;

receiving, at the vehicle authentication management server from the electronic device, a first message indicating that an identity of the first user of the electronic device has been verified based on at least the multiple-factor authentication; and in response to receiving the first message, sending, by the vehicle authentication management server to the communication subsystem of the vehicle, a second message indicating successful authentication of the first user.

2. The method of claim 1, wherein the one or more first authentication factors are identified based on retrieving, from a first database storing mappings of authentication factors to functionalities of the vehicle, those authentication factors that are associated with the requested first functionality.

3. The method of claim 1, further comprising:
sending, to the first user, a verification code; and
confirming that the verification code was inputted to the electronic device, wherein the instruction to perform a multiple-factor authentication of the first user is sent to the electronic device in response to the confirming.

4. The method of claim 3, wherein confirming that the verification code was inputted to the electronic device comprises receiving, from the electronic device, a confirmation message indicating that the verification code was inputted to the electronic device.

5. A method for controlling access to a vehicle, the method comprising:
receiving, at a vehicle authentication management server from an electronic device associated with the vehicle, a first request to access a first functionality associated with the vehicle;
sending, by the vehicle authentication management server to the electronic device, an instruction to perform, on the electronic device, a multiple-factor authentication of a first user of the electronic device based on one or more first authentication factors associated with the first functionality, wherein the instruction includes a requirement for the electronic device to evaluate at least the one or more first authentication factors;
receiving, at the vehicle authentication management server from the electronic device, a first message indicating that an identity of the first user of the electronic device has been verified based on at least the multiple-factor authentication;
verifying that the first user is authorized to access the vehicle; and
in response to the verifying, sending, by the vehicle authentication management server to a communication subsystem of the vehicle, a second message requesting the vehicle to grant access to the vehicle.

6. The method of claim 5, wherein the one or more first authentication factors are identified based on retrieving, from a first database storing mappings of authentication factors to functionalities of the vehicle, those authentication factors that are associated with the requested first functionality.

7. The method of claim 5, further comprising storing, in a second database, an association of the first user with the vehicle.

8. A system for controlling access to a vehicle, the system comprising:
a memory; and
a processor coupled to the memory, the processor being configured to:
receive, from a communication subsystem of the vehicle, a first request to authenticate a user requesting access to a first functionality associated with the vehicle;
send, to an electronic device associated with the vehicle, an instruction to perform, on the electronic device, a multiple-factor authentication of a first user of the electronic device based on one or more first authentication factors associated with the first functionality, wherein the instruction includes a requirement for the electronic device to evaluate at least the one or more first authentication factors;
receive, from the electronic device, a first message indicating that an identity of the first user of the electronic device has been verified based on at least the multiple-factor authentication; and
in response to receiving the first message, send, to the communication subsystem of the vehicle, a second message indicating successful authentication of the first user.

9. The system of claim 8, wherein the one or more first authentication factors are identified based on retrieving, from a first database storing mappings of authentication factors to functionalities of the vehicle, those authentication factors that are associated with the requested first functionality.

10. The system of claim 8, wherein the processor is further configured to:
send, to the first user, a verification code; and
confirm that the verification code was inputted to the electronic device, wherein the instruction to perform a multiple-factor authentication of the first user is sent to the electronic device in response to the confirming.

11. The system of claim 10, wherein confirming that the verification code was inputted to the electronic device comprises receiving, from the electronic device, a confirmation message indicating that the verification code was inputted to the electronic device.

12. A system for controlling access to a vehicle, the system comprising:
a memory; and
a processor coupled to the memory, the processor being configured to:
receive, from an electronic device associated with the vehicle, a first request to access a first functionality associated with the vehicle;
send, to the electronic device, an instruction to perform, on the electronic device, a multiple-factor authentication of a first user of the electronic device based on one or more first authentication factors associated with the first functionality, wherein the instruction includes a requirement for the electronic device to evaluate at least the one or more first authentication factors;
receive, from the electronic device, a first message indicating that an identity of the first user of the electronic device has been verified based on at least the multiple-factor authentication;
verify that the first user is authorized to access the vehicle; and
in response to the verifying, send, to a communication subsystem of the vehicle, a second message requesting the vehicle to grant access to the vehicle.

13. The system of claim 12, wherein the one or more first authentication factors are identified based on retrieving, from a first database storing mappings of authentication factors to functionalities of the vehicle, authentication factors that are associated with the requested first functionality.

14. The system of claim 12, wherein the processor is further configured to store, in a second database, an association of the first user with the vehicle.

* * * * *